Sept. 9, 1969  H. W. BOWERSOX  3,465,882
SKIMMER

Filed Dec. 12, 1966  2 Sheets-Sheet 1

INVENTOR
Harold W. Bowersox
BY
ATTORNEY

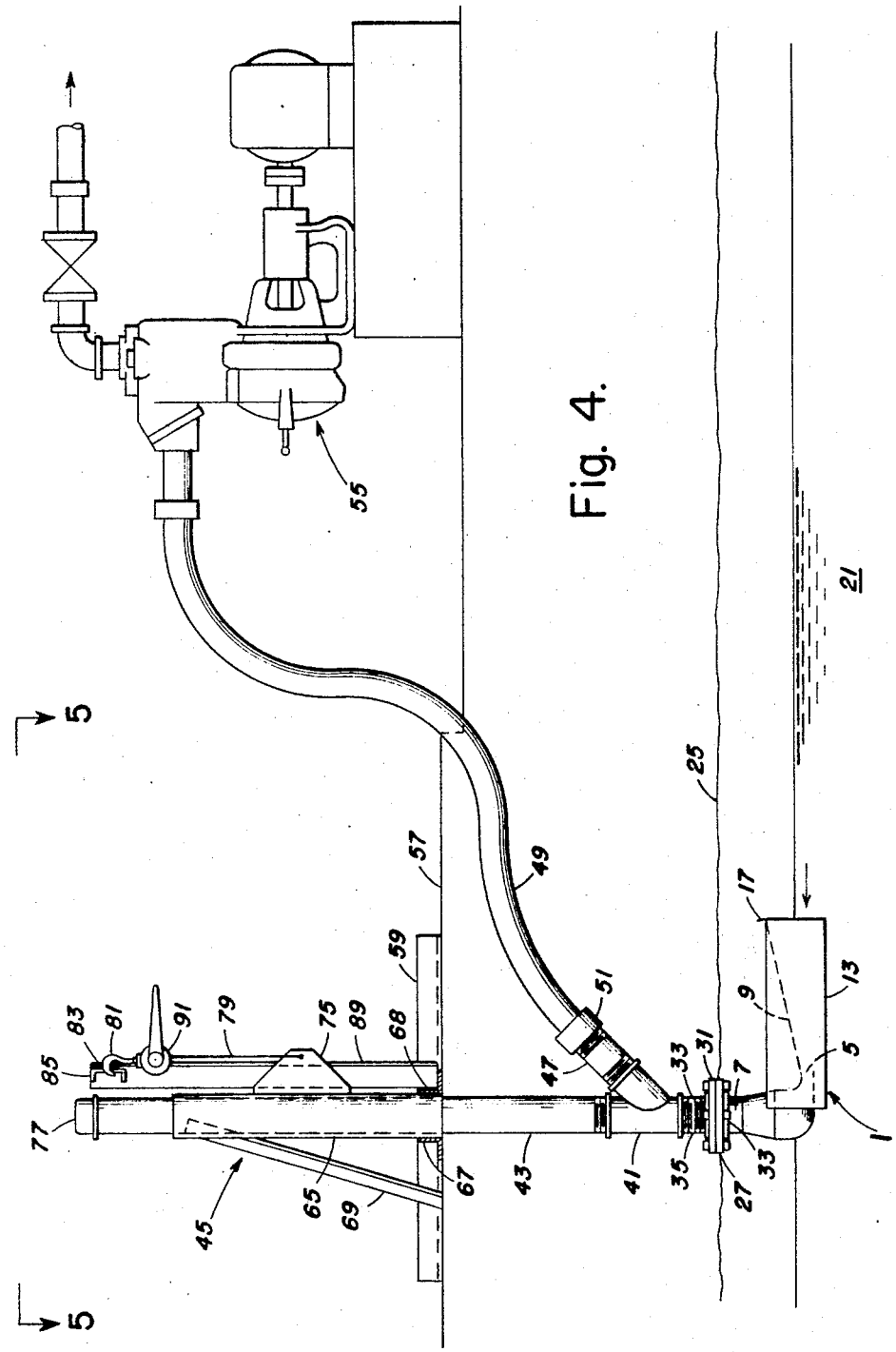

United States Patent Office 3,465,882
Patented Sept. 9, 1969

3,465,882
SKIMMER
Harold W. Bowersox, Dearborn, Mich., assignor to Wyandotte Chemicals Corporation, Wyandotte, Mich., a corporation of Michigan
Filed Dec. 12, 1966, Ser. No. 600,978
Int. Cl. B01d 43/00, 33/00
U.S. Cl. 210—154     4 Claims

ABSTRACT OF THE DISCLOSURE

This invention is directed to skimmers and skimming systems for removing floating and suspended material from the surface of a flowing stream of liquid and, more particularly, for removing oil and solids floating on the surface of the waste effluent from manufacturing facilities. The skimming device embodying the principle of this invention comprises an interceptor having a chamber defined therein, provided with an inlet and an outlet. The inlet has an elongated, rectangular opening, the lower boundary of which is formed by the lower horizontal edge of the interceptor. An extension member, the width of the inlet and joined to the interceptor at the upper boundary of the opening of the inlet, is providing having a lower surface extending upward and away from the inlet.

---

The skimmers to which this invention relates are used primarily to remove floating oil and solids from the surface of waste waters from industrial plants before discharging the waste to surface waters, streams, etc., outside the location of the industrial plant. The prior art devices for skimming oil and solids from the surface of waste water generally possess certain inherent defects due to the fact that the elevation of the surface of the water being skimmed will generally vary depending upon the amount of waste water being discharged from the industrial plant or facility. Accordingly, in order to skim the same depth from the surface of the flowing stream, it is necessary to constantly vary the elevation of the skimmer with the variations in the elevation of the surface of the stream. This requires either constant human attention or the provision of some type of automatic raising and lowering device which raises and lowers the skimmer with the variations in the elevation of the surface of the stream, all of which involves considerable expense.

Accordingly, it is a purpose of this invention to provide an apparatus for removing or skimming floating and suspended material from the surface of a flowing stream of liquid, particularly water, whereby in normal operation the skimming apparatus need not constantly be moved up and down with the rise and fall of the level of the surface of the liquid being skimmed.

This invention is best described with reference to the accompanying drawings wherein:

FIGURE 4 is an elevational view of the skimming apparatus embodying the principles of this invention, a supporting structure for the skimming apparatus and pumping means for removing the liquid and other materials skimmed from the surface.

Figure 2:
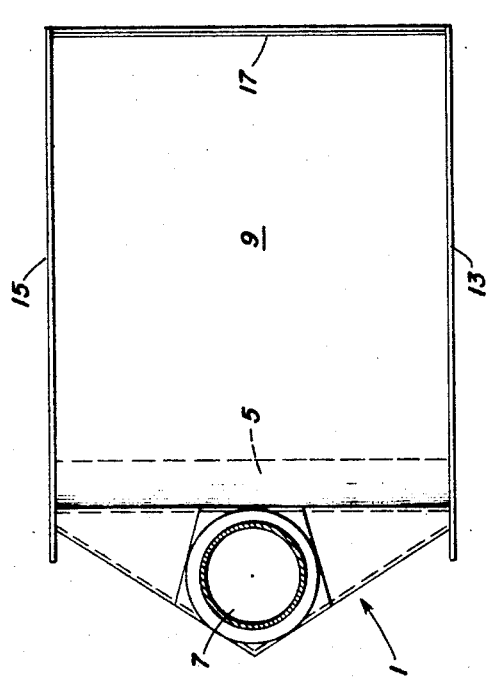
FIGURE 2 is a plan view in section of the skimming apparatus of this invention taken along the line 2—2 of FIGURE 1.
Figure 1:
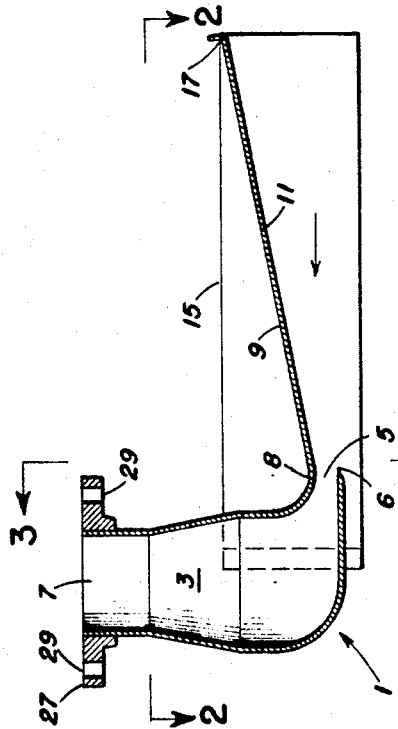
FIGURE 1 is an elevational view in section of a presently preferred skimming apparatus embodying the principles of this invention.
Figure 3:
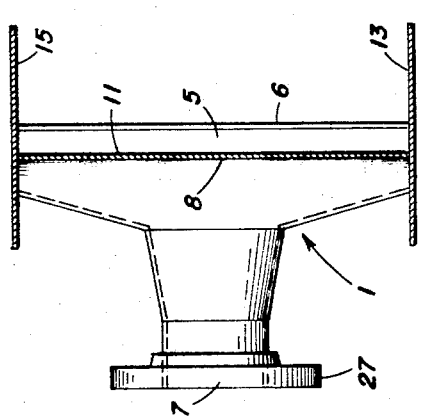
FIGURE 3 is an end elevational view in section of the skimming apparatus of this invention taken along the line 3—3 of FIGURE 1.

With reference to the drawing and, more particularly, FIGURES 1, 2 and 3 thereof, it will be seen that the skimming device embodying the principles of this invention comprises an interceptor indicated generally at 1, having a chamber 3 defined therein, provided with an inlet 5 and an outlet 7. The inlet 5 has an elongated, rectangular opening as shown more clearly in FIGURE 3. The lower boundary of this opening is formed by the lower horizontal edge 6 of the interceptor 1. An extension member 9, the width of inlet 5 and joined to interceptor 1 at the upper boundary 8 of the opening of inlet 5, is provided having a lower surface 11 extending upward and away from the inlet 5. The member 9 may be integral with the interceptor 1 extending from the upper boundary 8 of inlet 5 or may actually be a separate piece of material which is affixed to the interceptor 1 by suitable means such as welding. The term "joined," as used herein, includes both the integral structure for interceptor 1 and member 9 and a structure wherein member 9 is initially a separate member which has been affixed to interceptor 1.

The interceptor 1 including member 9 may be fabricated from any suitable material—metal such as steel generally being the most practical. Where the fluid to be skimmed is highly corrosive, corrosion-resistant material such as stainless steel, earthenware, hard rubber, etc., may be employed. In general, the interceptor 1 would be fabricated from several pieces of the material, such as steel, which are formed to the desired shape by conventional means and joined together by suitable means such as welding. In order to support the member 9, side plates 13 and 15 are provided which are affixed to the ends of interceptor 1 and the side edges of member 9 by suitable means such as welding.

In order to use the device of this invention shown in FIGURES 1, 2 and 3 for skimming the surface of a flowing stream of liquid, the device is made wide enough to span the width of the flowing stream. In the case of a stream flowing in a ditch, it would extend completely from one side to the other of the ditch and would be suspended or supported by suitable structural means to maintain it in position. In operation, the device of FIGURES 1, 2 and 3 is immersed in the stream with the inlet 5 on the upstream side thereof to a depth whereby the typical average elevation of the surface of the stream would be about halfway between the elevation of the upper boundary 8 of the inlet 5 and the elevation of the upper edge 17 of member 9. The device is fabricated to provide a difference in elevation between the upper boundary 8 of the inlet 5 and the upper edge 17 of member 9 which is greater than the difference between the highest and the lowest levels of the stream under normal operating conditions. Thus in normal operation regardless of the level of the stream, the upper surface of the stream is forced by the surface 11 down toward the inlet 5 whereby the inlet 5 skims the same thickness of liquid and other materials from the top surface of the flowing stream.

Figure 5:
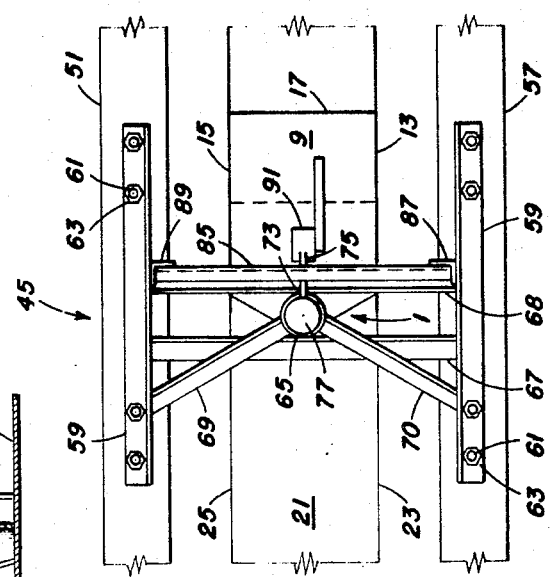
FIGURE 5 is a plan view of the skimming apparatus and support structure of this invention taken along the line 5—5 of FIGURE 4.

With reference now, more particularly to FIGURES 4 and 5, one preferred means for supporting interceptor 1 in a flowing stream for skimming material from the surface thereof and means for removing the intercepted fluid from the chamber 3 are shown. As showin in FIGURES 4 and 5, the interceptor 1 is suspended in a flowing stream of liquid 21, the banks or edges of which are defined at 23 and 25. The interceptor 1 and member 9 have sufficient width to completely span or extend across the stream 21, i.e., extend from bank 23 to bank 25 as shown more particularly in FIGURE 5. The stream 21 may be flowing in an open ditch as shown in FIGURES 4 and 5 which is merely dug into the earth, thus having walls of earth.

To facilitate a good fit between the interceptor 1 and reduce the possibility of bypassing the interceptor 1 as well as provide easy up-and-down movement thereof, the sides of the ditch 23 and 25 may be provided with retaining means, such as wooden or concrete retaining walls, at least in the area immediately adjacent to the interceptor 1. Since this is well within the skill of the art, this is not shown in detail in the drawings.

In the embodiment shown in FIGURES 4 and 5, the interceptor 1 is provided with a flange 27 having bolt holes 29 provided therein. Flange 27 may be affixed to interceptor 1 by suitable means such as welding. Flange 27 is supported by bolting to a mating flange 31 by conventional bolt and nut assemblies 33. Flange 31 in turn is affixed to a pipe 35 by suitable means such as threading. An angular type T connection 41 is affixed to pipe 35 by suitable means, such as threading, whereby two-branch pipe connections 43 and 47 may be made to pipe 35 by suitable means such as threading. One branch pipe 43 is employed primarily to support the assembly be means of the supporting structure indicated generally at 45 while the other branch pipe 47 is employed for connection to a flexible conduit 49 for removing the intercepted fluid from the interceptor 1. Flexible conduit 49 may be a conventional hose type conduit which is connected by conventional hose coupling means 51 to branch pipe 47. Hose conduit 49 in turn is connected by conventional means to the suction side of a conventional pump indicated generally at 55 whereby the intercepted material may be removed from interceptor 1 through outlet 7, connection 41, and conduit 49 by the action of pump 55. The suction of pump 55 is effective in producing a suction action at inlet 5 thereby assisting in the skimming action. The end of pipe 43 is capped by a suitable pipe cap 77 or other means to maintain pump suction by preventing air from entering through the otherwise open end of pipe 43.

Supporting structure 45 is supported on suitable foundations 57 which may be of any suitable material such as concrete imbedded in the earth on either side of the stream 21 in a conventional manner. Structure 45 is generally fabricated of suitable structural material such as steel and comprises a pair of angle members 59 which rest upon and are bolted to concrete foundations 57 by means such as bolts 61 imbedded in the concrete and nuts 63 threaded onto said bolts. A pipe 65 having an inside diameter just slightly larger than the outside diameter of branch pipe 43 is provided and disposed around branch pipe 43. Pipe 65 is supported in position by angle members 67, 68, 69, and 70 affixed to angle members 59 and pipe 65 as shown in FIGURES 4 and 5 by suitable means such as welding. A slot 73 is provided in the side of pipe 65 and a vertical plate 75 of a width sufficient to just fit within slot 73 is welded to pipe 43 in a position to fit within slot 73. The pipe 43 and consequently the interceptor 1 are supported vertically by plate 75, a chain or cable 79, and a hook 81 which hooks into an opening 83 in a horizontal structural member 85 which in turn is supported by vertical angle members 87 and 89 which are affixed to angle members 59 by suitable means such as welding. Thus, the interceptor 1 and pipe 43 are supported by a plate 75, cable 79 and hook 81 from member 83 in a vertical direction while being supported sideways by the manner in which the pipe 43 closely fits within pipe 65. This arrangement permits vertical adjustment of pipe 43 and interceptor 1 by the use of suitable means for winding and unwinding cable 79, such as a conventional ratchet-type, cable-winding device indicated at 91. Accordingly, the interceptor 1 is raised by winding cable 79 and lowered by unwinding it. Thus, the interceptor 1 may be positioned at the optimum depth for skimming the surface of the stream 21.

In the event of an unusually large change in the elevation of the surface of the stream 21, interceptor 1 may be raised or lowered by means of ratchet device 91. However, in view of the novel structure of the interceptor 1 of the instant invention, particularly through incorporation of member 9, such manual adjustment would only have to be made in the event of unusual changes of the elevation of the surface of the stream 21 due to factors such as an unusual increase or decrease in amount of effluent discharged from the industrial facility involved. However, with he device of this invention, it is not necessary to make constant adjustments for variations in surface elevation of the stream 21 as would be necessary with conventional skimming devices which merely comprise a slot or skimming pipe, etc., positioned at the surface of the water.

For use in connection with a stream 21 which has large, periodic variations in elevation, the device of this invention may be employed in combination with a conventional automatic power-operated raising and lowering device which could be substituted for, or incorporated with, the means 45 shown in FIGURE 4 and FIGURE 5 of the drawing, the operation of which is controlled by a conventional water-level sensing device and controller, all well known to those skilled in the art. Even where such a device is required, it would not be necessary to employ an automatic device which possesses the ability for fine control of the elevation of the skimming device but merely one which will make rough adjustments in response to substantial changes in elevation of the surface of the stream. The latter type of apparatus generally would involve considerably less expense over one which constantly made fine adjustments in the elevation of the skimming device.

It is to be understood that various changes and modifications may be made in the foregoing apparatus without departing from the spirit of the invention and scope of the appended claims.

What is claimed is:

1. An apparatus for removing floating and suspended material from the surface of a flowing stream of liquid comprising an interceptor having a chamber defined therein, provided with an inlet and outlet, said inlet having a rectangular opening with the lower boundary of said opening being formed by a lower edge of said interceptor, and a member joined to the interceptor at the upper boundary of said rectangular opening having a lower surface extending upward and away from said inlet.

2. The apparatus of claim 1 including means for removing said intercepted fluid from said chamber.

3. The apparatus of claim 2 wherein pumping means are employed for removing said intercepted fluid.

4. The apparatus of claim 3 including means for raising and lowering said interceptor and flexible connection means between said outlet and said pumping means.

References Cited

UNITED STATES PATENTS

| | | | |
|---|---|---|---|
| 2,497,177 | 2/1950 | McClintock et al. | 210—154 |
| 3,369,664 | 2/1968 | Dahan | 210—242 X |

REUBEN FRIEDMAN, Primary Examiner

T. A. GRANGER, Assistant Examiner